W. Y. E. DAVIS.
PEA PICKER OR HARVESTER.
APPLICATION FILED NOV. 6, 1915.

1,214,653.

Patented Feb. 6, 1917.
3 SHEETS—SHEET 1.

William Y. E. Davis Inventor

W. Y. E. DAVIS.
PEA PICKER OR HARVESTER.
APPLICATION FILED NOV. 6, 1915.

1,214,653.

Patented Feb. 6, 1917.
3 SHEETS—SHEET 2.

William Y. E. Davis Inventor

By Walter B. Durson
Attorney

Witnesses
W. W. Webster

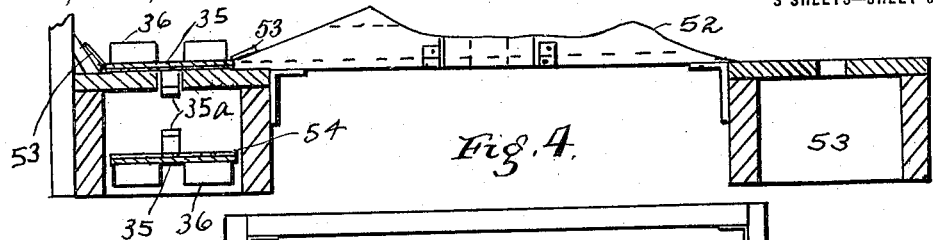
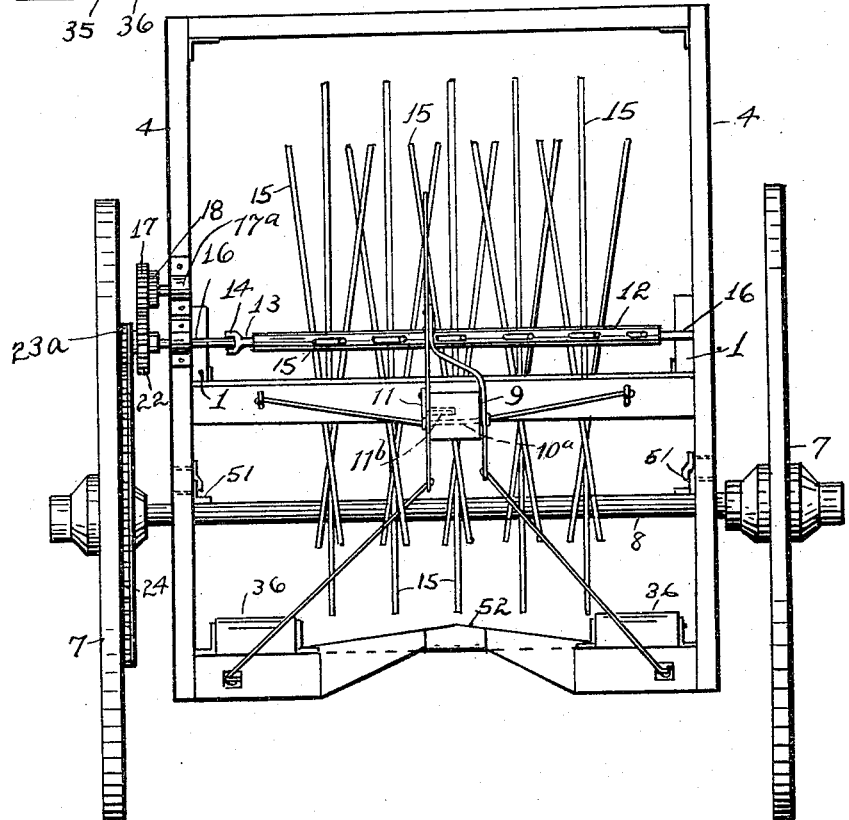
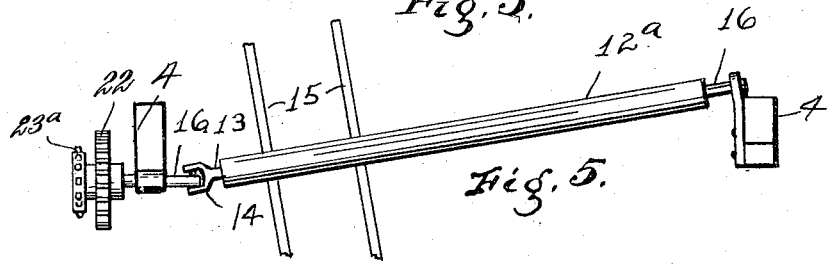

UNITED STATES PATENT OFFICE.

WILLIAM Y. E. DAVIS, OF NORFOLK, VIRGINIA.

PEA PICKER OR HARVESTER.

1,214,653.     Specification of Letters Patent.     Patented Feb. 6, 1917.

Application filed November 6, 1915. Serial No. 59,974.

*To all whom it may concern:*

Be it known that I, WILLIAM Y. E. DAVIS, a citizen of the United States, residing at Norfolk, in the county of Norfolk and State of Virginia, have invented certain new and useful Improvements in Pea Pickers or Harvesters, of which the following is a specification.

This invention relates to certain new and useful improvements in harvesters, and resides more especially in the production of means for gathering, shelling, cleaning, and delivering peas and the like to receiving bags or other receptacles.

An object of the present invention is to produce a harvester in which the threshing member is adapted to pass through the pea vines in angular relation with respect to the rows thereof, whereby a productive cross sweep is obtained, and the beaters or threshing tubes prevented from following directly behind one another.

Another object of this invention is the production of a harvester including in combination longitudinally oppositely arranged conveyers for carrying the peas threshed from the vines and hulls to a suitable elevation, and finally directing them into receiving packages or bags, at the rear of the machine.

A further object of the present invention is to produce a harvester embodying an adjustable supporting frame carrying conveyers, an angularly arranged threshing member, mounted forward of the said frame and between said conveyers, a deflecting board for discharging the peas onto the conveyers, suitable cleaning and product-receiving devices, and means for operating the aforesaid threshing member, conveyers, and other associated movable parts from a common source of power.

The invention further consists in the combination and arrangement of the several parts hereinafter described and pointed out in the appended claims.

Figure 1:
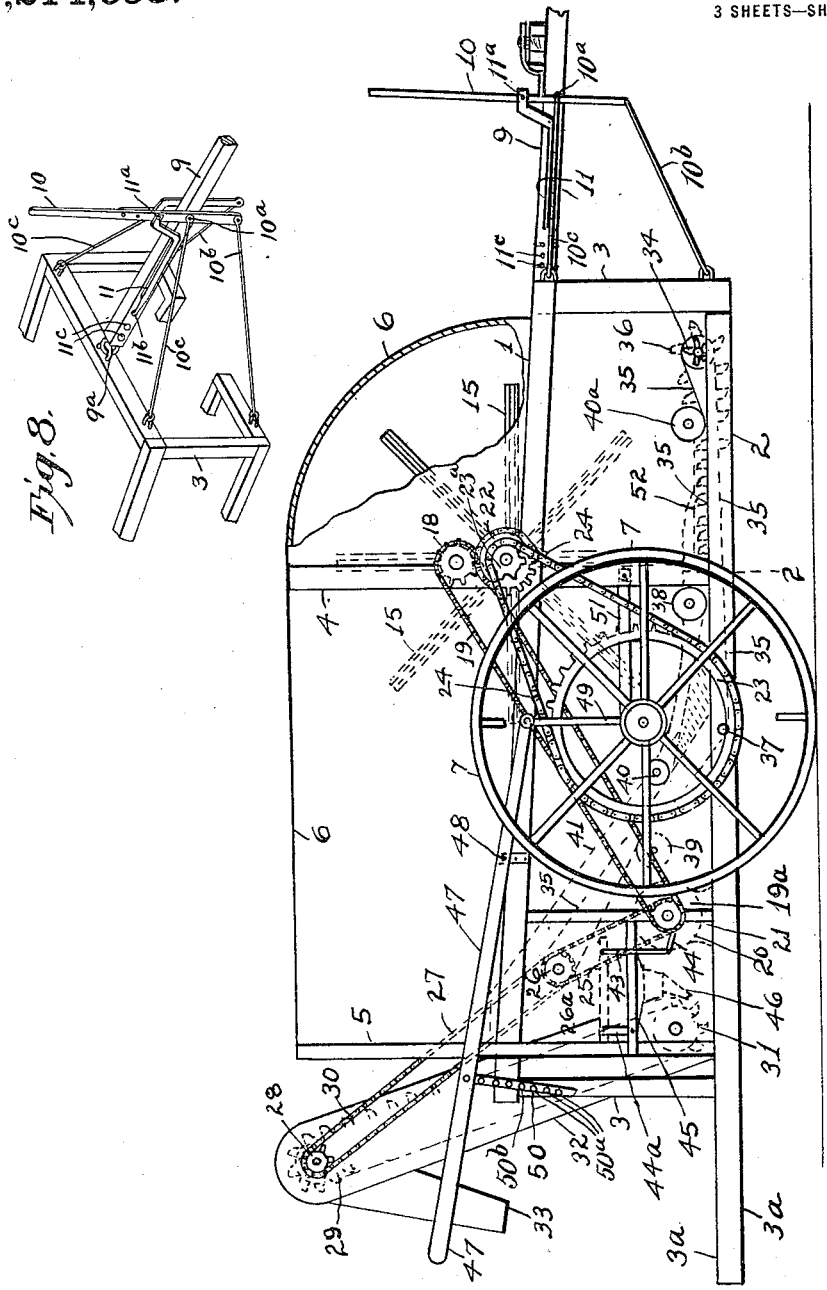
Figure 2:
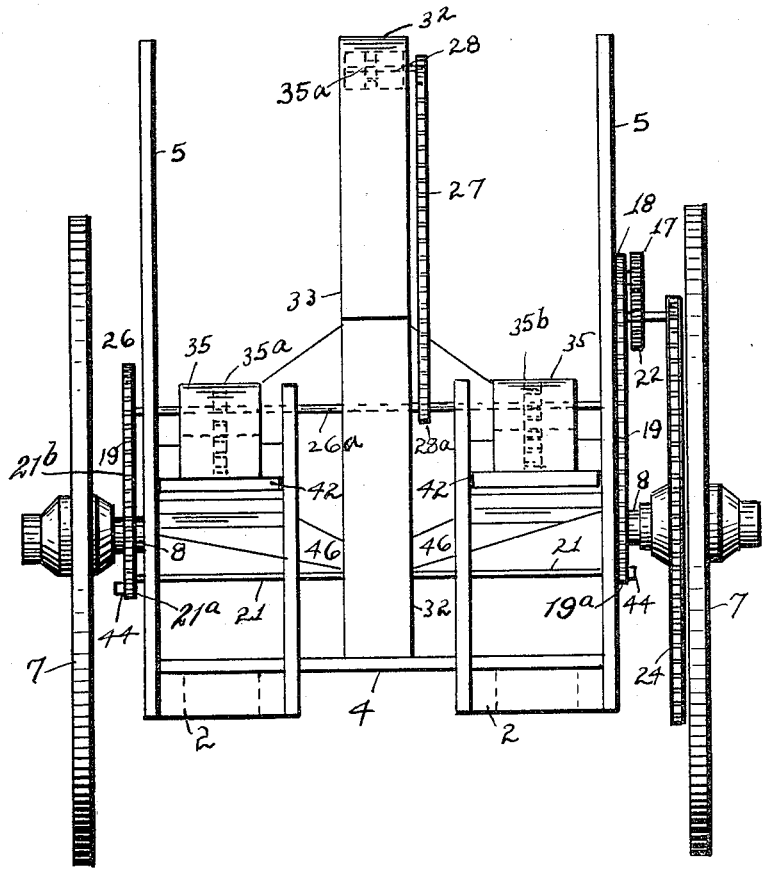
Figure 7:
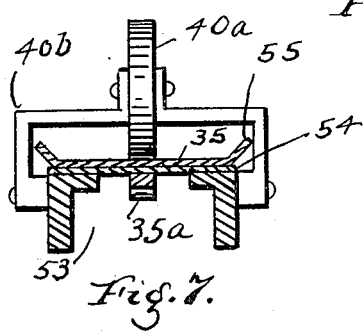
Figure 6:
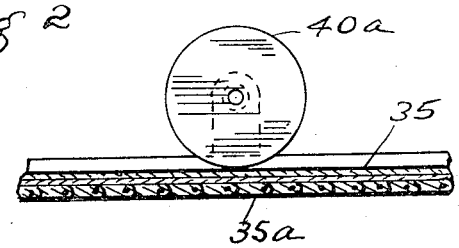

In the drawings: Figure 1 is a side elevation of the invention with parts broken away. Fig. 2 is an end or rear elevation of the harvester. Fig. 3 is a front elevation thereof. Fig. 4 is a detail cross sectional view through a portion of the frame showing one conveyer in sectional view and a portion of the deflecting board for guiding the peas onto the conveyer. Fig. 5 is a detail view of the threshing member shaft with a few of the beaters or threshing tubes in place, and the opposite bearing supports, illustrating the angular disposition thereof in the frame of the harvester. Fig. 6 is a fragmentary view of a portion of another form of conveyer belt and chain, and grinding roller therefor, and Fig. 7 is a detail cross-sectional view thereof. Fig. 8 is a detail perspective view of the lever mechanism for adjusting or tilting the frame.

This invention has been designed to overcome the difficulties now experienced in the handling of large and complicated harvesters through the ripened product on the vines, and to that end comprises a rectangular frame of moderate dimensions, intermediately arranged supporting wheels, a suitable draft connection for moving the harvester through the vines, readily accessible mechanism for operating the several parts, and certain adjustable features incidental to a ready manipulation of the harvester.

Referring to the drawings, in which corresponding reference characters designate similar parts, the frame comprises upper longitudinal members 1, lower longitudinal members 2, and suitable cross and vertical connecting members 3. The lower longitudinal members or beams 2 extend beyond the frame at the rear of the harvester as at 3$^a$, and serve to form a suitable platform or supporting frame on which rests the pea receiving package or bag. Extending above the main rectangular frame are uprights 4 and 5 which support the cover or casing 6 of the harvester as shown in Fig. 1.

The supporting wheels 7 are located intermediate the harvester on stub axles 8 carried and supported by adjustable members, hereinafter to be described. At the forward end of the harvester a draft attachment is shown, comprising a suitable tongue 9, provided with the usual whiffletree and other attachment for harnessing a draft animal thereto. The tongue 9 is pivotally connected to the frame of the harvester at 9$^a$.

Secured to the tongue 9 is a lever 10 the purpose of which is to lower and elevate the front of the harvester with relation to the adjustment of the supporting wheels 7. The lever 10 is pivoted at 10$^a$ to the tongue 9, and is pivotally connected at its lower end to the links 10$^b$ secured to the lower front end of the frame, as shown in Figs. 1 and 3. Other links 10$^c$ are connected to the lever 10 at the pivot point 10ª and, at their other ends are connected to the upper front end of the frame. The adjusting bar 11 is pivoted at one end to the lever 10 at 11ª, and at its other end is provided with an engaging pin 11ᵇ adapted to be inserted in openings 11ᶜ for different adjustments. By this construction it will be seen that as the engaging pin 11ᵇ is withdrawn from one of the openings and the lever 10 is rocked to tilt or adjust the frame, the engaging pin 11ᵇ carried by the said adjusting bar can be inserted in another opening and the frame held in its adjusted position.

The threshing member 12 is located near the forward end of the harvester and comprises an angularly disposed shaft 12ª in a horizontal plane, provided with end bearings 16 supported in the uprights 4 of the frame, and radiating beaters or threshing tubes 15 for passing through the vines. At one end of the shaft 12ª a universal joint is provided formed by the member 13 carried by the shaft 12ª, and a similar member 14 connected thereto and carried by the bearing end 16, see Fig. 5.

The radiating beaters or threshing tubes 15 are positioned in the shaft 12ª perpendicular thereto. These tubes are grouped in series of four, and pass diametrically through the shaft 12ª. They pass each other within the said shaft 12ª, in spaced relation, and present eight radiating beating arms equidistantly arranged about the circumference of the threshing member.

From this construction it will be seen that as the threshing member is rotated each series of the eight radiating beaters will travel in half as many separate paths, and by reason of the angular disposition of the shaft 12ª and the perpendicularly arranged radiating arms, a complete cross sweep of the vines will be obtained, and the heretofore consecutive path of travel of threshers of this type be prevented. In its passage through the vines the threshing member will remove the peas from the vines, shell them from their hulls, and then discharge them into a deflecting board located beneath the said thresher, from whence they are carried for further treatment.

The mechanism for driving the threshing member and certain other associated parts will now be described. Secured to one of the supporting wheels 7 of the harvester is a large sprocket wheel 23 through which power is transmitted to the other moving parts to be described later. An endless chain 24 passes around the sprocket wheel 23 and extends upwardly and over a small sprocket wheel 23ª keyed to one of the bearing ends 16 of the threshing member shaft 12ª, thereby rotating the radiating threshing tubes when threshing the peas through the universal connection heretofore explained. A gear wheel 22 is also keyed to the same end 16 of the threshing shaft 12ª, and is adapted to mesh with a similar gear 17 mounted on a shaft in a bearing support 17ª positioned on one of the uprights 4 of the frame, see Fig. 3. Secured to the gear 17 is a sprocket wheel 18 around which passes an endless sprocket chain 19 for transmitting motion through the sprocket wheel 19ª to suitable fans 20.

The fans 20 serve to clean the hulled peas of all chaff and other foreign material, and are positioned one on each side of the frame beneath the conveyers and sieves to be hereinafter described. The fans 20 are carried by a common shaft 21 which extends across the frame. On the opposite end of the said shaft 21 a sprocket wheel 21ª is keyed, around which passes an endless chain 21ᵇ adapted to rotate a sprocket wheel 26 keyed to the shaft 26ª for driving the conveyer belts. The shaft 26ª extends across the machine, and has keyed intermediate its ends a sprocket wheel 28ª around which passes an endless chain 27 adapted to rotate a sprocket wheel 28 carried by the upper shaft of the elevating mechanism.

The elevating mechanism or elevator consists of an endless belt 29, provided with suitable carriers or buckets 30 arranged to elevate the peas to the top of a casing 32 from whence they are discharged through a chute 33 to the receiving packages or bags (not shown), positioned upon the platform at the rear of the harvester. The elevator belt is slightly inclined and passes around a suitable roller 31 at the bottom of the casing 32.

The belt conveyers 35 for carrying the peas to the elevating mechanism are located on each side of, and within the main frame of the harvester, and are similar in construction. The conveyers are in the form of endless belts provided with spaced flights or buckets 36 adapted to carry the peas as they roll upon the conveyers. The conveyer belts 35 are attached to endless sprocket chains 35ª adapted to pass around suitable wheels 34 at the front of the harvester, and sprocket wheels 35ᵇ at the rear thereof as will be readily understood, see Figs. 1 and 2. The sprocket wheel 35ᵇ is keyed to the cross shaft 26ª and transmits motion to the conveyer belts.

The conveyer belts are guided by idler rollers 39 over which they pass, and idler rollers 40, 37, 38 and 40ª under which they pass as shown in Fig. 1. The purpose of these idler rollers is to guide the belt conveyers in a regular predetermined path of travel for carrying the peas to the elevator and cleaning device. A metal backing 54 may be inserted beneath the belt conveyers.

As the peas are carried by the conveyers to the rear of the harvester they are elevated to a point directly above cleaning screens or shaker sieves 42 onto which the peas are discharged. These cleaning screens are vibrated by means of pivoted levers 43 one end of each of which is connected to one end of each of pitman rods 44 having their opposite ends secured eccentrically to the gear wheel 19ª, and a similar disk or wheel, respectively, on the opposite end of shaft 21. The opposite ends of the levers 43 are secured to the screens at one end thereof, and movably support the said sieves in conjunction with hinged bars or levers 44ª secured to the opposite end of the said screens. As the shaft is rotated it will be seen that a shaking operation will be transmitted to the sieves 42, and all foreign matter separated from the peas as they fall therethrough into the discharge hoppers 45. The fans are preferably adapted to force currents of air through these sieves and remove all chaff from and about the peas, in the usual manner. The discharge hoppers 45 are each provided with spouts 46 for directing the cleaned peas into the casing 32 and in the path of travel of the elevating buckets 30 provided in the elevator, for delivery to the receiving bags as heretofore explained.

The mechanism for adjusting the relative height of the harvester from the ground comprises levers 47 pivoted at each side of the frame at 48 on the longitudinal members 1. Links 49 are connected at one end to one end of each of the levers 47, and at their other end to the stub axles 8 of the supporting wheels. Coöperating with the levers 47 near their outer ends are adjusting bars 50 provided with suitable perforations 50ª adapted to receive pins 50ᵇ for holding the frame in its adjusted position. I have described this form of adjusting bar, but it will be readily understood that various other forms can be substituted.

In connection with the frame raising and lowering mechanism there are provided links 51 secured at one end to the stub axles 8 of the wheels 7 and having their opposite ends pivotally connected to any convenient part of the frame, shown herein, however, as pivoted to the uprights 4, see Fig. 1. The purpose of these links is to obtain an even stability of the frame and supporting wheels when making the adjustment.

For insuring the deflecting of the peas onto the conveyers the central supporting surface or floor 52 of the harvester is provided with inclined surfaces extending from a central longitudinal apex 41 downwardly toward the sides of the conveyers, as shown in Figs. 1 and 4. By this construction, the peas will be deflected, and will roll onto either of the conveyers. Suitable flanges 53 are provided for confining the peas on the conveyers, see Fig. 4.

As shown in Figs. 6 and 7, the form of belt conveyers comprises the endless belt 35 having an upturned flange 55 formed integral therewith for preventing the peas from rolling off of the conveyer belt.

The operation of the machine is as follows: The front of the harvester having been positioned with respect to the supporting wheels and main frame in accordance with the height of the vines, the harvester is moved therethrough. Motion is transmitted through the large sprocket wheel 23 carried by one of the supporting wheels 7, to the several other mechanisms, as heretofore mentioned. The rotation of the threshing member causes the beaters to thresh the peas from the vines, and in so doing remove the hulls. As the peas fall on the deflecting surface 41 they roll onto the conveyer belts at each side of the frame, from whence they are carried upwardly and discharged onto the screens 42, through which they pass. The hulls and other materials which might be carried along are now caught in the said screens, and the peas continue onward through the hoppers 45 and spouts 46 to the elevator where they are caught and carried upwardly in the casing 32 and finally discharged into receiving packages or bags through the chute 33.

From the foregoing it will be obvious that an efficient and simply constructed harvester has been produced, in which a maximum amount of marketable produce can be gathered and treated for delivery.

Having thus described my invention, what I claim and desire to secure by Letters Patent is:

1. In a harvester the combination of a shaft having spirally arranged threshing members, with a frame having a channelway for guiding the vines into the path of the threshing members for stripping and threshing the vines, said shaft being inclined to the said channelway, and means for rotating said shaft.

2. In a harvester the combination of a shaft having spirally arranged threshing members, with a frame having a channelway running longitudinally thereof for guiding the vines into the path of the threshing members, said shaft being inclined to the said channelway and having the threshing members arranged perpendicular to the shaft, and means for rotating the said shaft.

3. In a harvester the combination with a shaft having spirally arranged threshing members, of a frame having a channelway running longitudinally thereof for guiding the vines into the path of the threshing members, said shaft being disposed in a horizontal plane above said channelway and inclined thereto and having the said threshing members arranged perpendicularly to said shaft, and means for rotating the shaft.

4. In a harvester the combination with a shaft having a plurality of spirally and radially arranged threshing members, of a frame having a channelway extending longitudinally thereof for guiding the vines into the path of said threshing members, said shaft being inclined with relation to said channelway and having the plurality of spirally and radially arranged threshing members equally inclined toward each other perpendicularly to the said shaft, and means for rotating the shaft.

5. In a harvester the combination with a shaft having a plurality of spirally arranged threshing members, of a frame having a channelway extending longitudinally thereof for guiding the vines into the path of travel of the said threshing members, the said shaft being inclined with relation to the said channelway and having the threshing members passed through the shaft and arranged perpendicularly thereto, and means for rotating the shaft.

In testimony whereof I have hereunto affixed my signature in the presence of two witnesses.

WILLIAM Y. E. DAVIS.

Witnesses:
W. W. ELLIOTT,
WALTER B. BURROW.

Copies of this patent may be obtained for five cents each, by addressing the "Commissioner of Patents, Washington, D. C."